United States Patent [19]
Deicke et al.

[11] Patent Number: 5,908,709
[45] Date of Patent: Jun. 1, 1999

[54] MATERIAL FOR SLIDING SURFACE BEARINGS

[75] Inventors: Klaus Deicke; Harald Pfestorf, both of Untereisesheim; Werner Schubert, Wiesloch; Thomas Steffens, Bad-Rappenau, all of Germany

[73] Assignee: Kolbenschmidt Aktiengesellschaft, Neckarsulm, Germany

[21] Appl. No.: 08/907,259

[22] Filed: Aug. 6, 1997

Related U.S. Application Data

[63] Continuation of application No. 08/534,758, Sep. 27, 1995, abandoned.

[30] Foreign Application Priority Data

Sep. 29, 1994 [DE] Germany .............................. 44 34 801

[51] Int. Cl.$^6$ ...................................................... F16C 33/06
[52] U.S. Cl. ......................... 428/653; 384/912; 148/416; 148/531; 428/654
[58] Field of Search ..................................... 148/416, 531; 420/530; 428/650, 653, 654; 384/912

[56] References Cited

U.S. PATENT DOCUMENTS

| | | | |
|---|---|---|---|
| 3,950,141 | 4/1976 | Roemer | 428/650 |
| 5,075,177 | 12/1991 | Tanaka et al. | 428/653 |
| 5,162,100 | 11/1992 | Tanaka et al. | 428/654 |
| 5,362,574 | 11/1994 | Tanaka et al. | 428/653 |
| 5,384,205 | 1/1995 | Tanaka et al. | 428/653 |
| 5,470,666 | 11/1995 | Tanaka et al. | 428/653 |

FOREIGN PATENT DOCUMENTS

| | | |
|---|---|---|
| 0205893 | 12/1986 | European Pat. Off. . |
| 1063005 | 1/1960 | Germany . |
| 1191114 | 4/1965 | Germany . |
| 50319 | 11/1966 | Germany . |
| 1427370 | 10/1968 | Germany . |
| 1521196 | 8/1969 | Germany . |

OTHER PUBLICATIONS

W Pat Abs of DE1521196; #71–082835;1971.

*Primary Examiner*—Margery Phipps
*Attorney, Agent, or Firm*—Sprung Kramer Schaefer & Briscoe

[57] ABSTRACT

A material for sliding surface bearings comprises a backing layer of steel and a clad-on layer made of an aluminum-base bearing material. To increase the fatigue limit the material 2 for sliding surface bearings has been heat-treated at 200 to 220° C. for 2 to 12 hours and the bearing material is composed of 14 to 18% by weight tin, 1.7 to 2.3% by weight copper, balance aluminum.

4 Claims, 1 Drawing Sheet

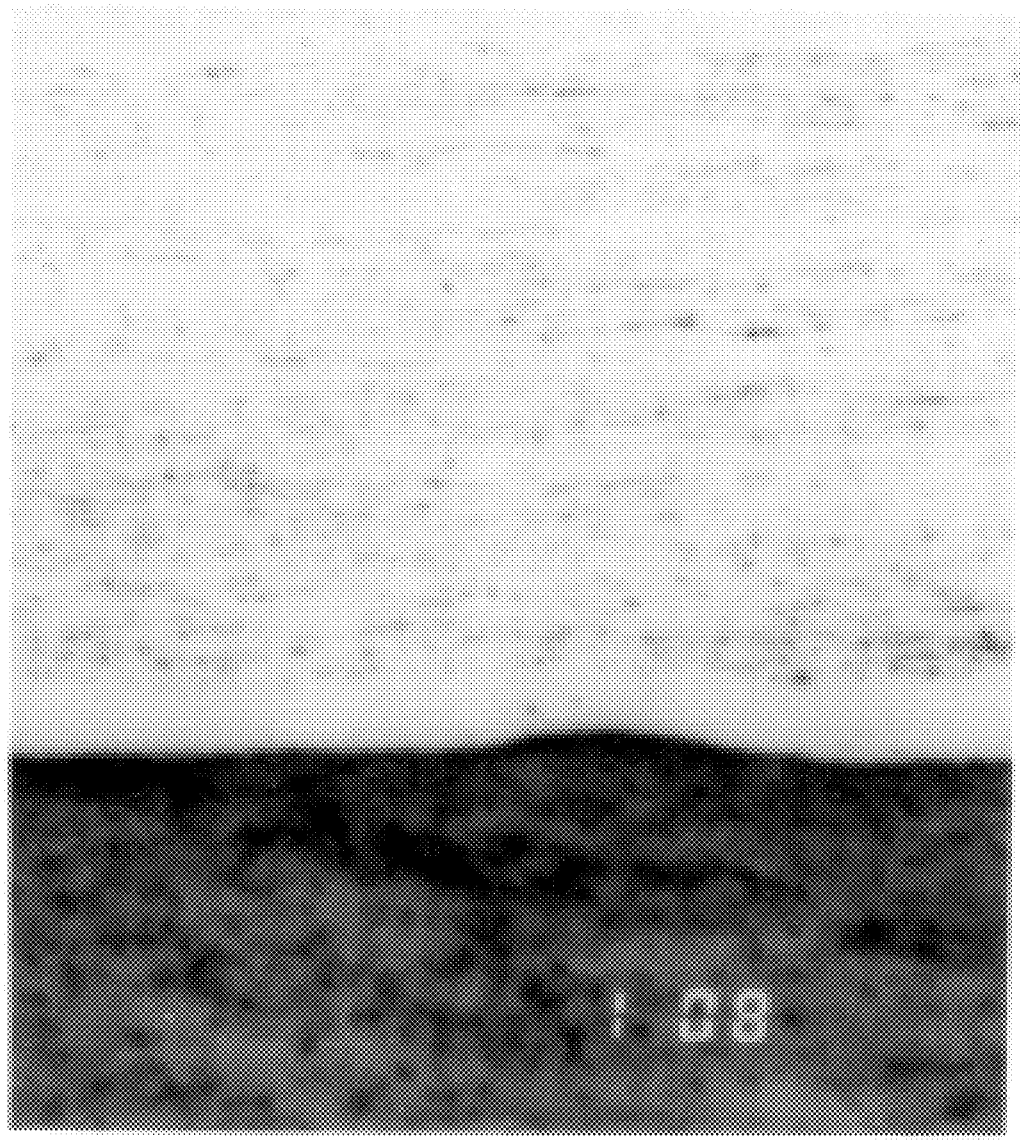

MATERIAL FOR SLIDING SURFACE BEARINGS

This application is a continuation of application Ser. No. 08/534,758, filed on Sep. 27, 1995 which is now abandoned.

DESCRIPTION

This invention relates to a material for sliding surface bearings which comprises a backing layer of steel and a clad-on layer of an aluminum-base bearing material.

The complex requirements to be met by bearings for moving parts, particularly in internal combustion engines, such as crankshafts and connecting rods, necessitate the use of multilayer materials for sliding surface bearings. Such materials consist of a backing layer of steel and a covering layer of a bearing material. A further layer may optionally be provided between said components. A combination of steel and aluminum-base bearing materials has proved particularly satisfactory for use under relatively high loads and has an adequate functional reliability under all operating conditions and can be made at relatively low cost. At high sliding velocities, such as occur in the crankshaft and connecting rod bearings of modern internal combustion engines, an electroplated sliding surface layer consisting of PbSn10Cu is additionally required in most cases. In the standard ISO 4383 an aluminum-base bearing material having the material acronym AlSn20Cu and the composition 17.5 to 22.5% by weight tin, 0.5 to 1.3% by weight copper, balance aluminum, for use in the manufacture of rolled bushings for sliding surface bearings is described. In that material, tin is included in the aluminum-copper matrix. That alloy may also contain up to 0.7% Si, 0.1% Mg, 0.1% Ni, 0.2% Ti, 0.7% Fe, 0.7% Mn and other elements in a total amount of 0.5%. That aluminum-base bearing material has become rather important in composites comprising also a backing layer of steel because that bearing material can be used in bearings for internal combustion engines in most cases without a need for a sliding surface layer. But that advantage involves a decrease of the carrying capacity of bearing elements made of that material for sliding surface bearings. Amounting to 35 to 45 N/mm$^2$, its fatigue limit is lower than that of bearing materials which comprise steel and lead bronze and are also often used for bearings in internal combustion engines. The bearing elements and friction washers made of the bearing material steel/AlSn20Cu have good sliding properties and a relatively low wear and are highly suitable for use under moderate loads up to 40 N/mm$^2$. They will have also a high resistance to edge-carrying elements and a good self-healing property at scores formed by wear.

It is an object of the present invention to provide for use in sliding surface bearings a material which comprises a steel layer and a clad-on bearing material made of an aluminum-copper matrix which includes finely divided tin, whereas it is free of an electroplated sliding surface layer (overlay) and has a fatigue limit of at least 55 N/mm$^2$ and in other respects has from the aspect of mechanical technology the good properties of the material consisting of steel and AlSn20Cu for use in sliding surface bearings.

That object is accomplished by the features stated in claim 1.

Desirable further features of the invention are stated in the dependent claims.

To make the material in accordance with the invention for use in sliding surface bearings the cold-rolled steel strip and the cold-rolled strip of the aluminum-base bearing material are degreased, ground or brushed, and bonded together in a cladding rolling mill in a continuous process. During the cladding in the rolling mill, the steel and the aluminum-base bearing material are deformed to different degrees under pressure. The resulting relative movement causes the two material components to be bonded by friction welding. The deformation of the steel and of the aluminum-base bearing material amounts to at least 45%. When the strip of steel and alumium-base bearing material has cooled and has been coiled up, the strip is heat-treated at temperatures from 200 to 220° C. for 2 to 12 hours whereby the bond between the steel and the aluminum bearing material is strengthened by a diffusion process and the tin, which is present in the aluminum-copper matrix in the form of bands, as a rule, is caused to assume a very finely divided state in the matrix.

The drawing is a micrograph of the structure of a three-layer material in accordance with the invention for use in sliding surface bearings. The steel backing 1 is additionally provided with a pure aluminum layer 2, which has a thickness of 0.03 mm and which is covered by a clad-on aluminum-base bearing material layer 3, which consists of 15% by weight tin, 1.9% by weight copper, 0.1% by weight titanium, balance aluminum.

We claim:

1. A material for sliding surface bearings which comprises a backing layer of steel, a clad-on layer of an aluminum-base bearing material which includes finely divided tin, and no electroplated sliding surface layer and which material for sliding surface bearings has been heat-treated at a temperature from 200 to 220° C. for 2 to 12 hours and wherein the bearing material consists essentially of 14 to 18% by weight tin, 1.7 to 2.3% by weight copper, and balance aluminum.

2. A material for sliding surface bearings according to claim 1, wherein said bearing material further comprises 0.05 to 0.2% by weight titanium.

3. A material for sliding surface bearings according to claim 1, wherein a pure aluminum layer having a thickness of 0.01 to 0.05 mm is provided between said steel layer and said bearing material layer.

4. A sliding surface bearing comprising a material for sliding surface bearings according to claim 1.

* * * * *